United States Patent
Maekawa et al.

(10) Patent No.: US 8,437,168 B2
(45) Date of Patent: May 7, 2013

(54) JOSEPHSON QUANTUM COMPUTING DEVICE AND INTEGRATED CIRCUIT USING SUCH DEVICES

(75) Inventors: Sadamichi Maekawa, Miyagi (JP); Taro Yamashita, Miyagi (JP); Saburo Takahashi, Miyagi (JP)

(73) Assignee: Japan Science and Technology Agency, Saitama (JP)

( * ) Notice: Subject to any disclaimer, the term of this patent is extended or adjusted under 35 U.S.C. 154(b) by 0 days.

(21) Appl. No.: 13/607,516

(22) Filed: Sep. 7, 2012

(65) Prior Publication Data

US 2012/0326130 A1 Dec. 27, 2012

Related U.S. Application Data

(62) Division of application No. 11/658,647, filed as application No. PCT/JP2005/013585 on Jul. 25, 2005, now Pat. No. 8,284,585.

(30) Foreign Application Priority Data

Jul. 27, 2004 (JP) ................................. 2004-219284
Dec. 24, 2004 (JP) ................................. 2004-375008

(51) Int. Cl.
*G11C 11/00* (2006.01)

(52) U.S. Cl.
USPC .............................. 365/129; 365/106; 257/34

(58) Field of Classification Search ................ 365/106, 365/129, 200; 257/13, 202, 97, E29.071, 257/E29.168, E49.003, 31–36, 661–663, 257/E39.001–E39.006, E39.012–E39.016; 438/73, 962; 977/708, 773, 774, 933
See application file for complete search history.

(56) References Cited

U.S. PATENT DOCUMENTS

| | | | |
|---|---|---|---|
| 5,323,344 A * | 6/1994 | Katayama et al. | 365/162 |
| 5,646,526 A * | 7/1997 | Takeda et al. | 324/248 |
| 6,078,517 A * | 6/2000 | Herr | 365/160 |
| 6,459,097 B1 * | 10/2002 | Zagoskin | 257/31 |

(Continued)

FOREIGN PATENT DOCUMENTS

JP 8-153904 A 6/1996

OTHER PUBLICATIONS

Mooij et al., "Josephson Persistent-Current Qubit", Science, Aug. 13, 1999, vol. 285, pp. 1036-1039. Cited in a parent U.S. Appl. No. 11/658,647.

(Continued)

*Primary Examiner* — Harry W Byrne
(74) *Attorney, Agent, or Firm* — Chen Yoshimura LLP

(57) ABSTRACT

A Josephson quantum computing device and an integrated circuit using Josephson quantum computing devices which can realize a NOT gate operation controlled with 2 bits will be provided. The Josephson quantum computing device (1) comprises: a superconducting ring member (10) having a π-junction (6) and a 0-junction (7); and a quantum state detecting member (20) constituted by a superconducting quantum interference device arranged outside of the superconducting ring member, wherein a bonding and an antibonding state brought about by a tunneling effect between a $|\uparrow\rangle$ and a $|\downarrow\rangle$ state as two states degenerate in energy of the superconducting ring member (10) are regarded as quantum bits. The bonding and antibonding states as the quantum bits are read out by the quantum state detecting member (20). The two bit controlled NOT gate operation can be performed by the two quantum bits comprising said quantum bits.

5 Claims, 10 Drawing Sheets

| Input | | Output | |
|---|---|---|---|
| Control Bit | Target Bit | Control Bit | Target Bit |
| 1 | 1 | 1 | 0 |
| 0 | 1 | 0 | 1 |
| 1 | 0 | 1 | 1 |
| 0 | 0 | 0 | 0 |

U.S. PATENT DOCUMENTS

| | | | |
|---|---|---|---|
| 6,563,310 B2* | 5/2003 | Zagoskin | 324/248 |
| 2003/0094606 A1* | 5/2003 | Newns et al. | 257/31 |
| 2004/0165454 A1* | 8/2004 | Amin et al. | 365/200 |
| 2005/0045872 A1* | 3/2005 | Newns et al. | 257/31 |

OTHER PUBLICATIONS

Van Der Wal et al., "Quantum Superposition of Macroscopic Persistent-Current States", Science, Oct. 27, 2000, vol. 290, pp. 773-777. Cited in a parent U.S. Appl. No. 11/658,647.

Ioffe et al., "Environmentally decoupled sds-wave Josephson junctions for quantum computing", Nature, Apr. 22, 1999, vol. 398, pp. 679-681. Cited in a parent U.S. Appl. No. 11/658,647.

Blatter et al., "Design aspects of superconducting-phase quantum bits", Physical Review B, Apr. 11, 2001, vol. 63, pp. 174511-1-174511-9. Cited in a parent U.S. Appl. No. 11/658,647.

Majer et al., "Spectroscopy on two coupled flux qubits", arXiv:cond-mat/0308192, Aug. 10, 2003, pp. 1-4, [online], full text. Cited in a parent U.S. Appl. No. 11/658,647.

Chiorescu et al., "Coherent Quantum Dynamics of a Superconducting Flux Qubit", Science, Mar. 21, 2003, vol. 299, Issue 5614, pp. 1869-1871, full text. Cited in a parent U.S. Appl. No. 11/658,647.

Frolov et al., "Measurement of the Current-Phase Relation of SFS pi-Josephson junctions", arXiv: cond-mat/0402434, Feb. 17, 2004, pp. 1-5, [online], full text. Cited in a parent U.S. Appl. No. 11/658,647.

Ioffe et al., "Quiet SDS' Josephson Junctions for Quantum Compting", arXiv:cond-mat/9809116, Jan. 11, 1999, pp. 1-4, [online], full text. Cited in a parent U.S. Appl. No. 11/658,647.

Yamashita et al., "Superconducting pi qubit with a ferromagnetic Josephson junction", arXiv:cond-mat/0410658, Oct. 26, 2004, pp. 1-4, [online], full text. Cited in a parent U.S. Appl. No. 11/658,647.

Yamashita et al., "Superconducting pi qubit with three Josephson junctions", arXiv:cond-mat/0507199, Jul. 8, 2005, pp. 1-3, [online], full text. Cited in a parent U.S. Appl. No. 11/658,647.

International Search Report (ISR) issued in PCT/JP2005/013585 (International application of a parent U.S. Appl. No. 11/658,647) mailed in Nov. 2005.

Written Opinion (PCT/ISA/237) issued in PCT/JP2005/013585 (International application of a parent U.S. Appl. No. 11/658,647) mailed in Nov. 2005.

* cited by examiner (A)

| Input | | Output | |
|---|---|---|---|
| Control Bit | Target Bit | Control Bit | Target Bit |
| 1 | 1 | 1 | 0 |
| 0 | 1 | 0 | 1 |
| 1 | 0 | 1 | 1 |
| 0 | 0 | 0 | 0 |

JOSEPHSON QUANTUM COMPUTING DEVICE AND INTEGRATED CIRCUIT USING SUCH DEVICES

This application is a divisional of a pending application, U.S. Ser. No. 11/658,647 filed on Jan. 26, 2007, which is the National Stage Application of PCT International Application No. PCT/JP2005/013585, both of which are hereby incorporated by reference in their entireties.

TECHNICAL FIELD

The present invention relates to a Josephson quantum computing device utilizing a Josephson device with a π-junction and which can be utilized in quantum computers, and to an integrated circuit using such computing devices.

BACKGROUND ART

The quantum computer is a computer that has an overwhelmingly rapid computing speed in solving particular problems that could not be solved in reality by conventional classical computers. In the quantum computer, a quantum two-level system called the quantum bit or qubit is utilized to correspond to a bit in a classical computer. While a number of qubits are used in computation, the most basic operation is carried out by unitary transformation manipulations for any one qubit and with a quantum operating device that reads out the qubit manipulated. In a solid-state electronic device, physical states proposed as usable for such qubits are superconducting, electronic and nuclear spin states.

At the outset, an explanation is given of basic particulars of qubits.

In general, if there are two physical states corresponding, respectively, to |0> and |1>, a state of superposition given by their superposition |0>+|1> functions as a qubit. Thus, while a classical bit is either 0 or 1, qubits other than |0> or |1> state include innumerable states intermediate between |0> and |1> and further those which are different in phase. It is called unitary transformation to let such a certain state |s> change to another state |s'>.

Qubits constituting a quantum computer need to equip the following four functions:

The first is initialization, requiring a means to set an initial state of a qubit as a well defined one, e. g., |0> or |1>.

The second is controlling a state (quantum operating gate), requiring a means to unitarily transform a prepared initial state (e. g., |0> or |1>) to any state of superimposition as desired |s>.

The third is to read out, requiring a detecting means to measure a unitarily transformed state |s>, namely to determine the values of amplitudes of |0> and |1>.

The fourth relates to expandability, requiring the conditional state control (controlled NOT gate) first on two bits and then requiring expansion by integration further to a number of qubits.

As quantum operating devices using superconducting qubits, there is a proposal to utilize electron pair boxes as two superconducting states having different charge states. There is also a proposal to utilize a superconducting quantum interference device (SQUID) to measure superconducting states having states different in phase.

In non-patent references 1 to 3 listed below, a theoretical proposal of a qubit consisting of a superconducting ring with three Josephson junctions and the detection of bonding and antibonding states in the proposed qubit have been reported. In this qubit, if an external magnetic field corresponding to half a unit magnetic flux is applied to the superconducting ring, two states degenerate in energy are realized. As a result, a bonding or an antibonding state that is any arbitrary state of superposition as desired of the second function mentioned above for qubits is formed. In such degenerate states, currents mutually opposite in direction flow through the superconducting ring. Thus, the superconducting ring to which an external magnetic field near the magnetic field corresponding to one half the unit magnetic flux is applied is irradiated with a microwave corresponding to an energy difference between the bonding and antibonding states, and a superconducting quantum interference device disposed around the quantum bit constituted of the superconducting ring is used to indirectly measure current flowing through the superconducting ring, thereby detecting if the state is bonding or antibonding.

In non-patent reference 4 in the list below, a theoretical proposal has been made on a qubit using a Josephson junction formed of an anisotropic (d-wave) superconductor and an isotropic (s-wave) superconductor. In this Josephson junction, by the effect of the anisotropic (d-wave) superconductor, its free energy becomes the minimum and its system becomes stable if the phase difference of the superconducting gap is $\pm\pi/2$. The proposed qubit is used to arbitrarily superpose the bonding and antibonding states formed of these two degenerate states as the second function mentioned above for qubits.

In non-patent reference 5 in the list below, there have been reported a theoretical proposal on a qubit constituted by a superconducting ring with one ferromagnetic π-junction and four 0-junctions and reference to the qubit using an anisotropic superconductor discussed in non-patent reference 3. It is shown that the free energy of this system has its minimum when the phase difference of the superconducting gap is $\pm\pi/2$, since the π junction large in the proportion of Josephson function is disposed between the two pairs of 0-junctions. The proposed qubit is used to arbitrarily superpose the bonding and antibonding states formed of these two degenerate states as the second function mentioned above for qubits.

Nonpatent Reference 1: J. E. Mooij and five others, "Josephson Persistent-Current Qubit", SCIENCE, vol. 285, pp. 1036 (1999);

Nonpatent Reference 2: Caspar H. van der Wal and seven others, "Quantum Superposition of Macroscopic Persistent-Current States", SCIENCE, vol. 290, pp. 773 (2000);

Nonpatent Reference 3: I. Chiorescu and three others, "Coherent Quantum Dynamics of a Superconducting Flux Qubit", SCIENCE, vol. 299, pp. 1869 (2003);

Nonpatent Reference 4: Lev B. Ioffe and four others, "Environmentally decoupled sds-wave Josephson junction for quantum computing", Nature, vol. 398, pp. 679 (1999); and Nonpatent Reference 5: G. Blatter and two others, "Design aspects of superconducting-phase quantum bits", Physical Review B, vol. 63, pp. 174511-1 (2001).

DISCLOSURE OF THE INVENTION

Problems to be Solved by the Invention

In quantum processing devices using a conventional superconducting ring as proposed in nonpatent references 1 to 3 above, however, creating two states degenerate in energy requires applying thereto an external magnetic field corresponding to half a unit magnetic flux. Therefore, the external magnetic field must always be applied to superimpose quantum bits.

In quantum processing devices using a conventional superconducting ring as proposed in nonpatent reference 4 above, no current flows through the superconducting ring in two degenerate states. Therefore, a circuit must be included for joining loops large in inductance for their discriminations.

In quantum processing devices using a conventional superconducting ring as proposed in nonpatent reference 5 above, four 0-junctions and one π-junction, namely five Josephson junctions, are required, complicating the structure.

Also, in a quantum processing device using a conventional superconducting ring, there is the problem that due to its large size, decoherence can easily be produced. The problem with decoherence is that quantum states of the quantum processing device are broken by an external noise or observation so that the device becomes no longer operating.

With these problems taken into account, it is a first object of the present invention to provide a Josephson quantum computing device comprising: a superconducting ring as a quantum bit which with no magnetic field applied can realize two degenerate states in which currents mutually opposite in direction flow therethrough and which is simple in structure having π and 0-junctions; and a superconducting quantum interference device capable of detecting a quantum state of the superconducting ring as the quantum bit.

It is a second object of the present invention to provide a Josephson quantum computing device comprising: a superconducting ring as a quantum bit which with no magnetic field applied can realize two degenerate states in which currents mutually opposite in direction flow therethrough and which is simple in construction having one π-junction and two 0-junctions; and a superconducting quantum interference device capable of detecting a quantum state of the superconducting ring as the quantum bit.

It is a third object of the present invention to provide an integrated circuit using such Josephson quantum computing devices and which is capable of performing a NOT logic gating operation controlled by two bits.

Means for Solving the Problems

In order to achieve the first object mentioned above, there is provided in accordance with the present invention a Josephson quantum computing device which is characterized in that it comprises: a superconducting ring member having a π-junction and a 0-junction; and a quantum state detecting member constituted by a superconducting quantum interference device arranged outside of the superconducting ring member, wherein a bonding and an antibonding state brought about by a tunneling effect between a $|\uparrow\rangle$ and a $|\downarrow\rangle$ state as two states degenerate in energy of the superconducting ring member are regarded as quantum bits, and the bonding and antibonding states as the quantum bits are read out by the quantum state detecting member.

Preferably in the structure mentioned above, the superconducting ring member comprises a pair of semicircular superconductors, a ferromagnetic metal sandwiched between adjacent first ends of the superconductors and an insulator sandwiched between adjacent second ends of the superconductors wherein said two superconductors and the ferromagnetic metal together form the π-junction, and the two superconductors and said insulator together form said 0-junction. Also, said bonding and antibonding states of the superconducting ring member are preferably controlled by a ratio (γ) of Josephson coupling constants at the π- and 0-junctions.

According to the structure mentioned above, the bonding and antibonding states as quantum degenerate states can be formed by a superconducting ring member with no external magnetic field applied thereto and in a simple construction. When utilized as quantum bits, these two degenerate states have currents flowing mutually opposite in direction and can thus be discriminated from each other, which makes it unnecessary to provide a separate circuit such as loops.

In the structure mentioned above, the bonding and antibonding states as the quantum bits are read out by the quantum state detecting member preferably upon applying thereto an external magnetic field. According to this structure, the quantum state detecting member is rendered capable of reading out only upon having a magnetic field applied thereto.

In the structure mentioned above, the bonding and antibonding states as said quantum bits are preferably states that they are superposed as desired by a microwave with which the quantum bits are irradiated. According to this structure, the bonding and antibonding states as the quantum bits can be superposed arbitrarily as desired only when the quantum bits are irradiated with a microwave.

In order to achieve the second object mentioned above, there is provided in accordance with the present invention a Josephson quantum computing device which is characterized in that it comprises a superconducting ring member having a π-junction and a first and a second 0-junction, each of which is constituted of a Josephson junction, and a quantum state detecting member constituted by a superconducting quantum interference device arranged outside of the superconducting ring member, wherein a bonding and an antibonding state brought about by a tunneling effect between a $|\uparrow\rangle$ and a $|\downarrow\rangle$ state as two states degenerate in energy of the superconducting ring member are regarded as quantum bits, and the bonding and antibonding states as the quantum bits are read out by the quantum state detecting member.

Preferably in the structure mentioned above, the superconducting ring member comprises a first, a second and a third superconductor which as a whole are disposed in the form of a ring and are strips essentially tri-partitioned of the ring and arranged having three interspaces between their adjacent ends and a ferromagnetic body and a first and a second insulator with which the three interfaces are filled, respectively, wherein the first superconductor, the first insulator and the third superconductor together form the first 0-junction; the second superconductor, the second insulator and the third superconductor together form the second 0 junction; and the first superconductor, the ferromagnetic body and the second superconductor together form the π-junction. Also, said bonding and antibonding states of the superconducting ring member are preferably controlled by a ratio (γ) of Josephson coupling constants at the first and second 0-junctions and the π-junction.

According to the structure mentioned above, the bonding and antibonding states as quantum degenerate states can be formed by a superconducting ring member with no external magnetic field applied thereto and in a simple construction. When utilized as quantum bits, these two degenerate states have currents flowing mutually opposite in direction and can thus be discriminated from each other, which makes it unnecessary to provide a separate circuit such as loops.

In the structure mentioned above, the bonding and antibonding states as the quantum bits are read out by the quantum state detecting member preferably upon applying thereto an external magnetic field. According to this structure, the quantum state detecting member is rendered capable of reading out only upon having a magnetic field applied thereto.

In the structure mentioned above, the bonding and antibonding states as said quantum bits are preferably states that they are superposed as desired by a microwave with which the quantum bits are irradiated. According to this structure, the bonding and antibonding states as the quantum bits can be superposed arbitrarily as desired only when the quantum bits are irradiated with a microwave.

In order to achieve the third object mentioned above, there is provided an integrated circuit which is characterized in that it uses Josephson quantum computing devices as mentioned above. Preferably, two such quantum bits adjacent to each other are so arranged as to bring about a magnetic interaction and they are operated as a controlled NOT gate. Also, the bonding and antibonding states as the quantum bits are preferably states that they are superposed as desired by a microwave with which the quantum bits are irradiated to operate as a controlled NOT gate.

According to this structure, the NOT gate operation controlled by two bits can be realized by Josephson quantum computing devices according to the present invention.

Effects of the Invention

According to the Josephson quantum computing device of the present invention, quantum bonding and antibonding states which are created by the superconducting ring member provided with the $\pi$-junction and the 0-junction can be utilized. These quantum bonding and antibonding states can be created with no external magnetic field applied. These two degenerate states in which mutually opposite currents are flowing through the superconducting ring member can easily be discriminated from each other. Also, quantum bits of the superconducting ring member can be detected by quantum state detecting member constituted of superconducting quantum interference device disposed around the superconducting ring member.

According to the Josephson quantum computing device of the present invention, quantum bonding and antibonding states which are created by the superconducting ring member provided with two 0-junctions and a $\pi$-junction can be utilized. These quantum bonding and antibonding states can be created with no external magnetic field applied. These two degenerate states in which mutually opposite currents are flowing through the superconducting ring member can easily be discriminated from each other. Also, quantum bits of the superconducting ring member can be detected by the quantum state detecting member constituted of superconducting quantum interference device disposed around the superconducting ring member.

According to the present invention, the device having a structure constituted only of three Josephson junctions can be reduced in size. Consequently, the device can be much less affected by decoherence attributable to an interaction with its outside.

According to the integrated circuit using Josephson quantum computing devices of the present invention, it is possible to perform a NOT gate operation controlled with 2 bits in addition to a 1-bit operation.

BRIEF DESCRIPTION OF THE DRAWINGS

In the drawings,

FIG. 10 is a truth table showing the operations of the NOT gates controlled with 2 quantum bits as in FIGS. 8 and 9.

DESCRIPTION OF REFERENCE CHARACTERS

Figure 1:
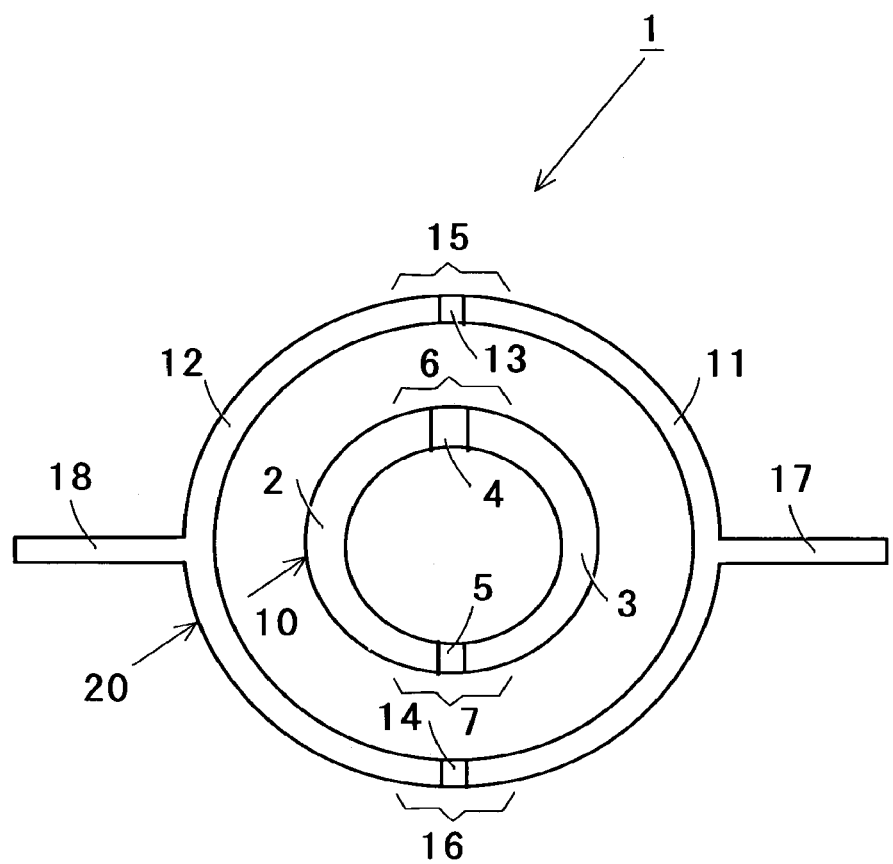
FIG. 1 is a plan view diagrammatically illustrating the structure of a Josephson quantum computing device according to the present invention.

1, 30: Josephson quantum computing device
2, 3, 11, 12: Superconductor
4, 35: Ferromagnetic metal (F)
5, 13, 14: Insulator
6: First junction ($\pi$-junction, Josephson junction S1/F/S2)
7: Second junction (0-junction, Josephson junction S1/I/S2)
10: Superconducting ring member
15, 16: Josephson junction in superconducting quantum interference device
17, 18, 57, 58: Current terminal
20, 60: Quantum state detecting member (SQUID)
32: First superconductor (S1)
33: Second superconductor (S2)
34: Third superconductor (S3)
35: Ferromagnetic metal (F)
36: Insulator
37: Insulator
40: Superconducting ring member
41: First 0-junction (Josephson junction S1/$I_1$/S3)
42: Second 0-junction (Josephson junction S2/$I_2$/S3)
43: $\pi$-junction (Josephson junction S1/F/S2)
51, 52: Superconductor
53, 54: Insulator
55, 56: Josephson junction in superconducting quantum interference device
60: Quantum state detecting member (SQUID)
70: Integrated circuit using Josephson computing devices
72: Substrate
74, 75: Microwave

BEST MODES FOR CARRYING OUT THE INVENTION

Hereinafter, the present invention will be described in detail with reference to certain suitable forms of implementation thereof illustrated in the drawing Figures. In the Figures, the same reference characters are used to designate the same or corresponding components.

At the outset, an explanation is given of a first form of implementation of the Josephson quantum computing device according to the present invention. FIG. 1 is a diagrammatic plan view illustrating the structure of a Josephson quantum computing device according to the present invention. Referring to FIG. 1, the Josephson quantum computing device 1 comprises a superconducting ring member 10 with a π- and a 0-junction and a quantum state detecting member 20 disposed in its outside coaxially therewith. The superconducting ring member 10 and the quantum state detecting member 20 of the Josephson quantum computing device 1 can be formed on a substrate. Further, it should be noted that the Josephson quantum computing device operates at a temperature that exhibits superconductivity.

The superconducting ring member 10 consists of semicircular strip superconductors 2 and 3 (hereinafter referred to as S1 and S2 for the sake of convenience) and a ferromagnetic metal 4 (hereinafter referred to conveniently as F) and an insulator 5 (hereinafter referred to conveniently as I) which are sandwiched between the adjacent first ends and the adjacent second ends of the two superconductors 2 and 3, respectively, and is in the form of a ring as a whole. The superconductors 2 and 3 may be superconductors of the same type. The superconducting ring member 10 operates as a Josephson quantum bit. The superconductors 2 and 3 may be Nb, Pb or the like, the ferromagnetic metal 4 may be CuNi, PdNi or the like, and the insulator 5 may be made of aluminum oxide (AlOx), PbO or the like.

A junction made of superconductor 2 and ferromagnetic metal 4 and superconductor 3, namely Josephson junction S1/F/S2 (hereinafter referred to conveniently as junction 6) is a junction of the first adjacent ends of the semicircular strip superconductors 2 and 3 with the ferromagnetic metal 4 sandwiched between these adjacent ends in contact therewith. The first junction 6 is a π-junction that becomes stable when the phase difference θ between the superconductors 2 and 3 (S1 and S2) is π.

On the other hand, a junction made of the superconductor 2 and the insulator 5 and the superconductor 3, namely Josephson junction S1/I/S2 (hereinafter referred to conveniently as junction 7) is a junction at a position diagonally opposite to that of the π-junction, namely of the second adjacent ends of the semicircular strip superconductors 2 and 3 with the insulator 5 (hereinafter referred to conveniently as I) sandwiched between these adjacent ends, that is a tunneling junction. The second junction 7 is a 0 junction that becomes stable when the phase difference θ' between the superconductors 2 and 3 (S1 and S2) is 0.

Mention is next made of the quantum state detecting member 20.

The quantum state detecting member 20 is a superconducting quantum interference device (also called SQUID) having two Josephson junctions. The quantum state detecting member 20 comprises two superconductors 11 and 12 which are arranged in the form of a semicircular strip and two insulators 13 and 14 sandwiched between the first and second ends of them, respectively, to form Josephson junctions 15 and 16. Current terminals 17 and 18 are disposed at positions 90° spaced from the Josephson junctions 15 and 16. One of the Josephson junctions 15 consists of the superconductor 11, the insulator 13, and the superconductor 12 and the other Josephson junction 16 is formed from the superconductor 11, the insulator 14, and the superconductor 12. The superconductors 11 and 12 may be of the same material as that of the superconductors 2 and 3 in the superconducting ring member 10. Also, the insulators 13 and may be the same in material as the insulator 5 in the superconducting ring member 10.

The quantum state detecting member 20 is arranged to read out a quantum state of the Josephson quantum bit in the superconducting ring member 10.

It should be noted further that the superconducting ring member 10 may not only be circular but also be in the form of a rectangular ring. Then, the quantum state detecting member 20 arranged outside of the superconducting ring member 10 may, too, be in the form of a rectangular ring similar to the superconducting ring member 10.

The Josephson quantum computing device so constructed as mentioned above operates as described below.

At the outset, an explanation is given of the operation of a quantum bit. The total free energy in the superconducting ring member 10 inside operating as the quantum bit is expressed by the sum of respective electrostatic energies $T_1$ and $T_2$ in the first and second junctions 6 and 7, respective Josephson energies $U_1$ and $U_2$ in the first and second junctions 6 and 7 and magnetic energy $U_L$ stored in the superconducting ring member 10. Behaviors of this system correspond to motions of a particle with kinetic energy $T_2$ in potential $U_1 + U_2 + U_L$.

The electrostatic energy in the first junction 6 is expressed by $T_1 = Q_1^2/2C_1$. Likewise, the electrostatic energy in the second junction 7 is expressed by $T_2 = Q_2^2/2C_2$. Here, $Q_1$ and $Q_2$ are charges stored at the first and second junctions 6 and 7, respectively. $C_1$ and $C_2$ are electrostatic capacitances at the first and second junctions 6 and 7, respectively.

The electrostatic energy $T_1$ at the first junction 6 that is of metal contact as being a metallic junction is much smaller than the electrostatic energy $T_2$ at the second junction 7 sandwiching the insulator film 5 and is negligible ($T_1 \ll T_2$). Also, the superconducting critical current $I_\pi$ at the first junction 6 which is a π-junction of metal contact is expressed by equation (1) below.

$$I\pi = 2eE_\pi/\hbar \qquad (1)$$

where e is the elementary electric charge and $\hbar$ is the Planck constant divided by 2π. And, $E_\pi$ is the coupling constant representing the strength of Josephson junction.

Using the coupling constant $E_\pi$, the Josephson coupling energy is expressed by $U_1 = -E_\pi |\cos((\theta+\pi)/2)|$.

On the other hand, the superconducting critical current $I_0$ at the second junction 7 which is a normal Josephson junction sandwiching the insulator 5 is expressed by equation (2) below.

$$I_0 = 2eE_0/\hbar \qquad (2)$$

where $E_0$ is the Josephson coupling constant, and the binding energy at the second junction 7 is expressed by $U_2 = -E_0 \cos \theta'$.

The Josephson energy $U_2$ at the second junction 7 can be expressed as a function of θ, since there is a relation $\theta - \theta' = 2\pi\Phi/\Phi_0$ (where $\Phi_0$ is the unit magnetic flux; $\Phi_0 = h/2e = 2.086 \times 10^{-15}$ Wb) between phase differences θ and θ' of the first and second junctions 6 and 7 through magnetic flux Φ passing the inside of the superconducting ring member 10. Note here that the ratio of Josephson coupling constants at the first and second junctions 6 and 7 is assumed to be $\gamma = E_{90}/E_0$.

Further, the magnetic energy $U_L$ stored in the superconducting ring member 10 is expressed by $U_L = (\Phi - \Phi_{ext})^2/2L$. Here, L is a self inductance and $\Phi_{ext}$ is an externally applied magnetic flux. There is introduced $\alpha = 2\pi L I_0 \Phi_0$ as a dimensionless parameter representing the magnitude of self inductance.

Results of computation of the total free energy in the superconducting ring member 10 operating as quantum bits are explained.

Figure 2:
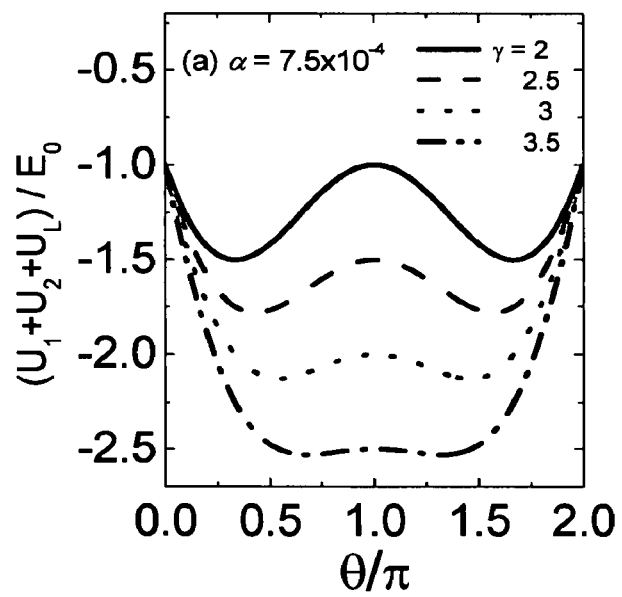
FIG. 2 is a diagram illustrating the dependence of total free energy ($U_1+U_2+U_L$) for various $\gamma$ values when $\alpha=7.5\times10^{-4}$.

FIG. 2 is a diagram illustrating the dependence of the total free energy ($U_1 + U_2 + U_L$) for various γ values when $\alpha = 7.5 \times$ $10^{-4}$. The state here is, however, where no external magnetic flux is applied ($\Phi_{ext}=0$). The value of $\alpha$ corresponds to where the radius of the superconducting ring member 10: r=5 μm, the cross section of the junction surfaces: $S=10^{-2}$ μm² and the thickness of the insulator in the second junction 7: d=1 nm. In FIG. 2, the abscissa axis represents the phase θ (π radian) of the second junction 7 and the ordinate axis represents the total free energy of the second junction 7 normalized by Josephson coupling constant $E_0$ (($U_1+U_2+U_L$)/$E_0$; this energy is called "normalized total free energy").

If the ratio $\gamma(=E_\pi/E_0)$ of the Josephson coupling constants at the first and second junctions 6 and 7 is incrementally increased by 0.5 from 2 to 3.5, the normalized total free energy (($U_1+U_2+U_L$)/$E_0$) varies with the phase θ of the second junction 7. As can be seen from FIG. 2, where γ is around 2 to 3, the normalized total free energy has the two minimum values degenerate in energy and the θ corresponding to them is the phase difference that is realized.

Figure 3:
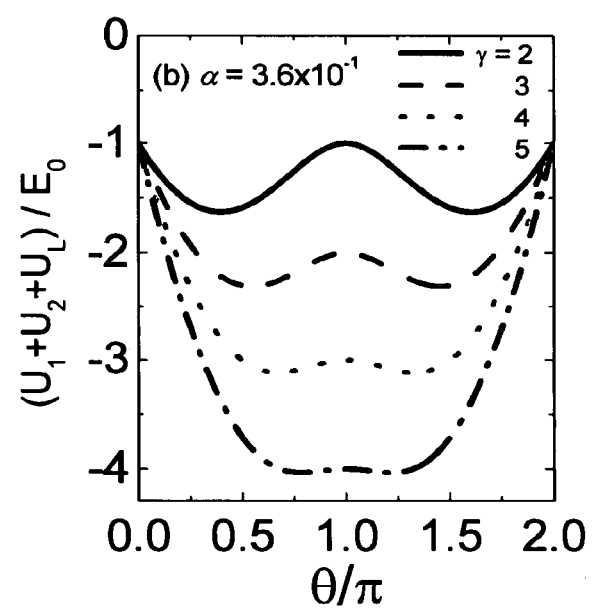
FIG. 3 is a diagram illustrating the dependence of total free energy ($U_1+U_2+U_L$) for various $\gamma$ values when $\alpha=3.6\times10^{-1}$.

FIG. 3 is a diagram illustrating the dependence of the total free energy ($U_1+U_2+U_L$) for various γ values when $\alpha=3.6\times 10^{-1}$. The state here is, however, where no external magnetic flux is applied ($\Phi_{ext}=0$). The abscissa and ordinate axes in the Figure are the same as those in FIG. 2. The value of α corresponds to where the radius of the superconducting ring member 10: r=1 mm, the cross section of the junction surfaces: $S=10^{-2}$ μm² and the thickness of the insulator in the second junction 7: d=1 nm.

If the ratio $\gamma(=E_\pi/E_0)$ of the Josephson coupling constants at the first and second junctions 6 and 7 is incrementally increased by 1 from 2 to 5, the normalized total free energy varies with the phase θ of the second junction 7. As can be seen from FIG. 3, where γ is around 2 to 4, the normalized total free energy has the two minimum values degenerate in energy and the θ corresponding to them is the phase difference that is realized.

In FIGS. 2 and 3, the two minimum values degenerate in energy become the two stable states. Let these two stable states to be |↑> and |↓>. In the states |↑> and |↓>, electric currents of the same magnitude are flowing in mutually opposite directions through the superconducting ring member 10, and magnetic fluxes of the same magnitude and in mutually opposite directions corresponding thereto enter the superconducting ring member 10. The magnitude of currents then flowing in the states |↑> and |↓> become |I|~|$I_0$|~$10^{-2}$ μA in both FIGS. 2 and 3. The magnitude of the magnetic fluxes passing through the superconducting ring member 10 becomes |Φ|~2.1×$10^{-19}$ Wb (γ=3) with FIG. 2 and 1.0×$10^{-16}$ Wb (γ=3) with FIG. 3.

The electrostatic energy in the second junction 7 becomes $T_2$~6.8×$10^{-23}$ J if alumina ($Al_2O_3$) of a dielectric constant: k~8.5 is used as the insulator 5. Since this value of electrostatic energy $T_2$ is close in the order to the Josephson coupling constant $E_0$~3.3×$10^{-24}$ J, a tunneling effect is brought about between the |↑> and |↓> as the two states degenerate in energy with the result that the bonding and antibonding states in which |↑> and |↓> are superposed appear. Here, the bonding state: |0> is expressed as |0>∝|↑>+|↓> and is the ground state. The antibonding state: |1> is expressed as |1>∝|↑>−|↓> and is the excited state.

Therefore, in the superconducting ring member 10 according to the present invention, the bonding state bit: |0>=|↑>+|↓> and the antibonding state bit: |1>=|↑>−|↓> are utilized as quantum bits.

As an energy gap ΔE exists between the bonding and antibonding states, it is possible to irradiate a quantum bit with a microwave angular frequency: ω=ΔE/h (h: Planck constant) corresponding to the gap and to observe its resonance absorption and thereby to check the presence of the bonding or antibonding state. The frequency corresponding to the gap (f=ω/2π) is found to be around several GHz by various constants used in computation of the total free energy shown in FIG. 2.

Thus, it is seen that the bonding and antibonding states can be realized by the quantum bits consisting of one π-junction and one 0-junction, two in total, of the superconducting ring member 10 in which conditions such as the electrostatic energy $T_2$, the Josephson coupling constant $E_0$ and γ are appropriately selected. And, these bonding and antibonding states can be realized with no external magnetic field applied. Further, since in the two states degenerated, currents directed mutually opposite are passed through the superconducting ring member 10, they are easy to discriminate. Since the quantum bit according to the present invention consists of 2 junctions, the structure is simple. They are easy to manufacture, accordingly.

The two stable states to be brought about in the superconducting ring member 10 and the bonding and antibonding states can be effected at the same time. On the other hand, the superconducting ring member 10 can be initialized as follows. Namely, if it is kept at low temperature sufficient so that thermal excitation from the bonding state |0> that is a ground state to the antibonding state |1> that is an excitation state may not occur, it can be relaxed to the ground state and hence be initialized to the bonding state |0>.

Further, in the case of exciting from the bonding state |0> of the superconducting ring member 10 to its antibonding state |1>, if the superconducting ring member 10 is irradiated with a microwave of a frequency corresponding to the energy gap $\Delta E_{B1}$ which is when the superconducting ring member 10 is in the state |1> its state can be excited from the bonding state |0> to the antibonding state |1>.

Next, the readout operations of the bonding and antibonding states of the quantum bit will be explained. The bonding and antibonding states of the quantum bit of the superconducting ring member 10 are read out by the superconducting quantum interference device of the quantum state detecting member 20 disposed around the Josephson quantum bit of the superconducting ring member 10. In this case, a bias current is applied between current terminals 17 and in the superconducting quantum interference device of the quantum state detecting member 20 and a value of current (switching current), which gives rise to a finite voltage when the current is increased, is measured for readout.

Here, mention is made of where no external magnetic flux is applied ($\Phi_{ext}=0$). Zero magnetic flux will be detected as an anticipated value when the quantum bit is in the bonding or antibonding state, since in the degenerate |↑> and |↓> states, magnetic fluxes mutually opposite in direction enter the superconducting ring member 10.

On the other hand, since an asymmetry in θ dependence of the potential occurs when a small external magnetic flux is applied ($\Phi_{ext}\neq 0$), a finite flux is detected in the bonding and antibonding states as well. This allows the bonding and antibonding states of the quantum bits of the superconducting ring member 10 to be read out by making a flux measurement with the superconducting quantum interference device of the quantum state detecting member 20 while changing the external magnetic flux in the vicinity of zero.

As described above, the Josephson quantum computing device 1 according to the present invention allows the functions to initialize, to control the state and to read out to be realized with Josephson quantum bits by the superconducting ring member 10 with π- and 0-junctions and the quantum state detecting member 20.

The Josephson quantum computing device of the present invention constructed as mentioned above can be fabricated as described below.

First, a superconductor becoming the superconducting ring member 10 and the quantum state detecting member 20 is deposited by sputtering onto an insulating substrate to a selected thickness. Then, the superconducting ring member 10 and the ring of quantum state detecting member 20 are formed by selective etching process with mask. The superconductor at those areas of the ferromagnetic metal 4 and the insulator 5 of the superconducting ring member 10 and the insulators 13 and 14 of the quantum state detecting member 20 is etched, too.

Next, an insulating material such as aluminum oxide becoming the insulators 5, 13 and 14 is deposited by sputtering or CVD method to a selected thickness. And, excess portions of the insulating material are removed by selective etching. In this process step, the 0-junction 7 and the quantum state detecting member 20 are formed.

Finally, a film of the ferromagnetic metal 4 is deposited by sputtering to a selected thickness. And, an excess portion of the ferromagnetic metal film is removed by selective etching. In this process step, the π-junction 6 is formed. In depositing each material, an ordinary thin film forming method such as vapor deposition, laser ablation or MBE other than sputtering or CVD may be used. Also, in masking steps for forming junctions and current terminals of selected shapes, photo or electron beam exposure may be used.

A second form of implementation of the Josephson quantum computing device according to the present invention will be explained.

Figure 4:
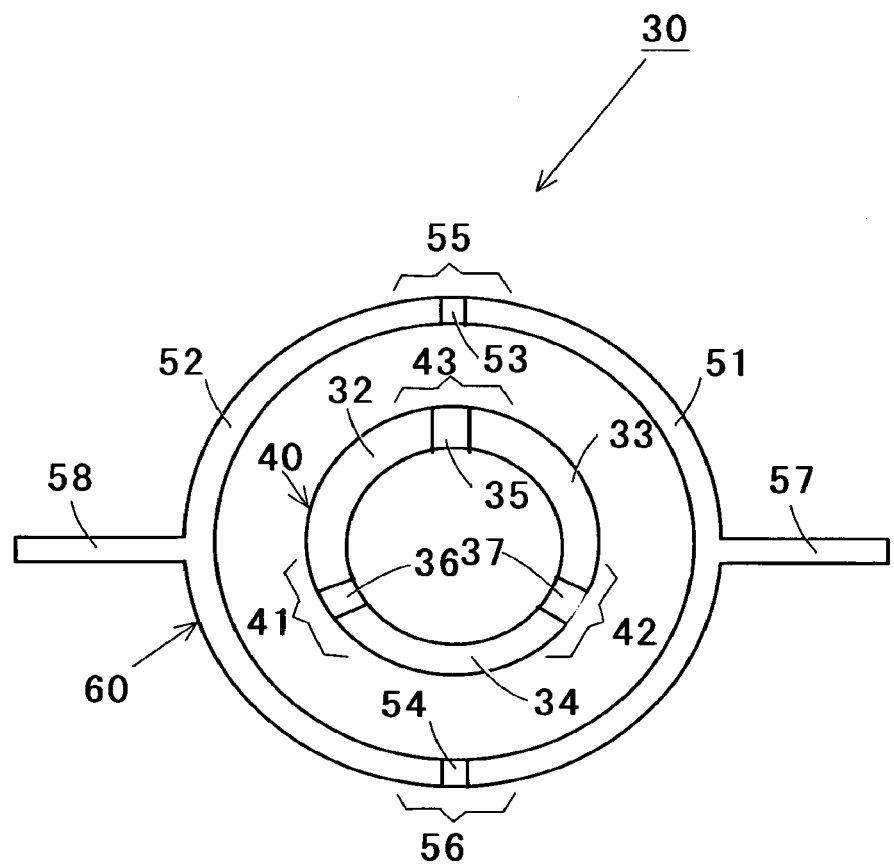
FIG. 4 is a plan view diagrammatically illustrating the structure of a Josephson quantum computing device according to the present invention.

FIG. 4 is a plan view diagrammatically illustrating the structure of a Josephson quantum computing device 30 according to the present invention. As shown, the Josephson quantum computing device 30 according to the present invention comprises a superconducting ring member 40 with two 0-junctions 41 and 42 and one π-junction 43 each of which is a Josephson junction and a quantum state detecting member 60 arranged outside of the superconducting ring member 40 coaxially therewith. The superconducting ring member 40 and the quantum state detecting member 60 of the Josephson quantum computing device 30 may be formed on a substrate. It should be noted here that the Josephson quantum computing device of the present invention operates at a temperature at which superconductivity is exhibited.

The superconducting ring member 40 comprises a first, a second and a third superconductor 32, 33 and 34 clockwise (hereinafter referred to conveniently as S1, S2 and S3, respectively) which as a whole are disposed in the form of a ring and are strips essentially tri-partitioned of the ring and arranged having three interspaces open between their adjacent ends and a ferromagnetic metal 35 (hereinafter referred to conveniently as F) and a first and a second insulator 36 and 37 (hereinafter referred to conveniently as $I_1$ and $I_2$, respectively) with which the three interfaces are filled, respectively.

The ferromagnetic metal 35 is arranged sandwiched between the adjacent ends of the first and second superconductors 32 and 33. The first insulator 36 is arranged sandwiched between the adjacent ends of the first and third superconductors 32 and 34. The second insulator 37 is arranged sandwiched between the adjacent ends of the second and third superconductors 33 and 34. The first to third superconductors 32, 33 and 34 may be of an identical superconducting material. The first and second insulators 36 and 37 may be of an identical insulating material. The superconducting ring member 40 operates as a Josephson quantum bit. The first to third superconductors 32, 33 and 34 used may be of Nb, Pb or the like, the ferromagnetic metal 35 used may be of CuNi, PdNi or the like, and the first and second insulators 36 and 37 used may be of aluminum oxide (AlOx), PbO or the like.

The first 0-junction 41 is a Josephson junction made of the first superconductor 32, the first insulator 36 and the third superconductor 34. The first 0-junction $S1/I_1/S3$ is a tunneling junction made of the adjacent ends of the first and third strip superconductors 32 and 34 that are substantially tri-partitions of the circle and the first insulator 36 sandwiched between these ends. The first 0-junction 41 is a 0-junction that becomes stable if the phase difference $\theta_1$ between S1 and $I_1$ and S3 forming the 0-junction is zero.

The second 0-junction 42 is a Josephson junction made of the second superconductor 33, the second insulator 37 and the third superconductor 34. The second 0-junction $S2/I_2/S3$ is a tunneling junction made of the adjacent ends of the second and third strip superconductors 33 and 34 that are substantially tri-partitions of the circle and the second insulator 37 sandwiched between these ends. The second 0-junction 42 is a 0-junction that becomes stable if the phase difference $\theta_2$ between S2 and $I_2$ and S3 forming the 0-junction is zero.

On the other hand, the π-junction 43 is a Josephson junction made of the first superconductor 32, the ferromagnetic body 35 and the second superconductor 33. That is, the π-unction S1/F/S2 is a tunneling junction made of the adjacent ends of the first and second strip superconductors 32 and 33 that are substantially tri-partitions of the circle and the ferromagnetic body 35 sandwiched between these ends. The π-junction 43 is a π-junction that becomes stable if the phase difference $\theta_3$ between S1 and F and S2 forming the π-junction is π.

The quantum state detecting member 60 will be explained next. The quantum state detecting member 60 comprises a so called superconducting quantum interference device having a pair of Josephson junctions. The quantum state detecting member 60 has semicircular superconductors 51 and 52 arranged in the form of a ring and insulators 53 and 54 sandwiched between their respective and adjacent ends to form Josephson junctions 55 and 56. Current terminals 57 and 58 are provided at positions spaced by about an angle of 90° from the Josephson junctions 55 and 56.

One Josephson junction 55 is formed of the superconductor 51, the insulator 53 and the superconductor 52 while the other Josephson junction 56 is formed of the superconductor 51, the insulator 54 and the superconductor 52.

Here, the superconductors 51 and 52 may be of a same material as that of the first, second and third superconductors 32, 33 and 34 of the superconducting ring member 40. The insulators 53 and 54 may be of a same material as that of the first and second insulators 36 and 37 of the superconducting ring member 40. The insulator 53 of the quantum state detecting member 60 is arranged opposed to the ferromagnetic body 35 of the superconducting ring member 40.

The quantum state detecting member 60 is disposed to read out a quantum state of the Josephson quantum bit in the superconducting ring member 40.

Here, it should be noted further that the superconducting ring member 40 may not only be circular but also be a square ring. Then, the quantum state detecting member 60 disposed outside of the superconducting ring member 40 may be a square ring similar to the superconducting ring member 40.

An explanation is next given of operations of the Josephson quantum computing device according to the present invention constructed as mentioned above.

At the beginning, the quantum bit will be mentioned. The total fee energy in the quantum bit is expressed as a sum of electrostatic energies $K_1$, $K_2$ and $K_3$, Josephson coupling energies $U_1$, $U_2$ and $U_3$ at the first and second 0-junctions and π-junction 41, 42 and 43, and the magnetic energy $U_L$ stored in the superconducting ring.

First, the electrostatic energy at the first 0-junction 41 is expressed as $K_1 = Q_1^2/2C_1$. Likewise, the electrostatic energy at the second 0-junction 42 is expressed as $K_2 = Q_2^2/2C_2$, and electrostatic energy at the π-junction 43 as $K_3 = Q_3^2/2C_3$. Each of these electrostatic energies corresponds to the kinetic energy in the phase space. $Q_1$, $Q_2$ and $Q_3$ are charges stored at the first and second 0-junctions 41 and 42 and the π-junction 43. $C_1$, $C_2$ and $C_3$ are capacitances of the junctions 41, 42 and 43.

Next, the binding energies of the first and second 0-junctions are expressed as $U_1 = -E_0 \cos \theta_1$ and $U_2 = -E_0 \cos \theta_2$, respectively. Here, $E_0$ is the Josephson coupling constant, and the Josephson coupling constant at the second 0-junction 42 is regarded as being equal to that at the first 0-junction 41.

The Josephson binding energy at the π-junction 43 is expressed as $U_3 = -E_3 \cos(\theta_3 + \pi)$ where $E_3$ is the Josephson coupling constant. The ratio of the Josephson constants at the 0-junctions 41, 42 and π-junction 43 is considered as $\gamma = E_3/E_0$.

With respect to total magnetic flux $\Phi$ passing through the superconducting ring member 40, the magnetic energy $U_L$ stored in the superconducting ring member 40 is expressed as $U_L = (\Phi - \Phi_{ext})^2 / 2L$. Here, L is a self inductance and $\Phi_{ext}$ is a magnetic flux externally applied. And, $\alpha = 4\pi^2 E_3 L / \Phi_0^2$ is introduced where $\Phi_0$ is a unit magnetic flux as a dimensionless parameter that represents the self inductance.

Mention is next made of the total free energy at the superconducting ring member 40 operating as the quantum bit. Total free energy $U_{tot}$ is expressed as $U_{tot} = U_1 + U_2 + U_3 + U_L$ and as a function of four variables ($\theta_1$, $\theta_2$, $\theta_3$, $\Phi$). The total free energy becomes a function of two variables ($\theta_1$, $\theta_2$) from relations that $\theta_1 + \theta_2 + \theta_3 = 2\pi\Phi/\Phi_0$ which stands between the superconducting phase and total magnetic flux, and the condition ($U_{tot}/\Phi = 0$) under which the total free energy for total magnetic flux $\Phi$ becomes the minimum.

Figure 5:
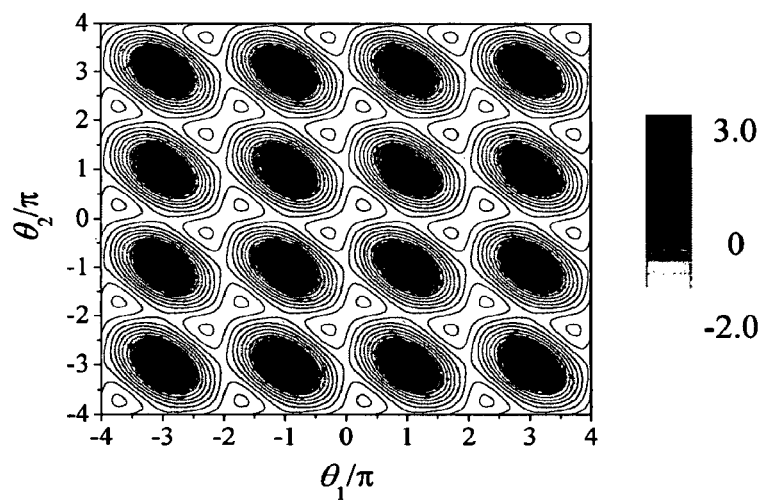
FIG. 5 shows results of computation of total free energy wherein (A) is a contour diagram in a ($\theta_1$, $\theta_2$) space where no external magnetic field is applied ($\Phi_{ext}=0$) and (B) is a diagram illustrating the dependence of $U_{tot}$ on phase space diagonal direction.
Figure 5:
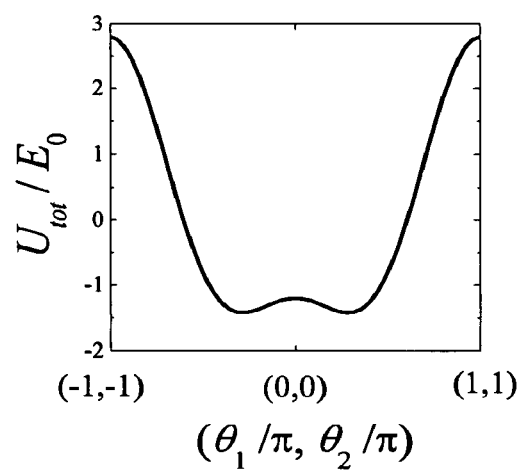

FIG. 5 shows results of computation of the total free energy wherein (A) is contour diagram in a ($\theta_1$, $\theta_2$) space where no external magnetic field is applied ($\Phi_{ext} = 0$) and (B) is a diagram illustrating the dependence of $U_{tot}$ phase space on diagonal direction. In FIG. 5(A), the abscissa axis represents $\theta_1$ which is normalized with π and the ordinates represents $\theta_2$ which is normalized with π. In FIG. 5(B), the abscissa axis represents $\theta_1$ and $\theta_2$ in diagonal direction which are normalized with π and the ordinates represents $U_{tot}$ which is normalized with $E_0$. The value of α corresponds to the case that r=1 μm, S=0.1 μm and d=1 nm where r is the ring radius of the superconducting ring member 40, S is the cross sectional area of junction surfaces of the first and second 0-junctions and the π-junction 41, 42 and 43, and d is the thickness of the insulators and is that $\alpha = 3.1 \times 10^{-3}$. Also, it applies that $\gamma = 0.8$.

As is apparent from FIG. 5, it is seen that centering on coordinates (2n π and 2m π where n and m are each an arbitrary integer) in the phase space, there are found two minimum values degenerate in their respective diagonal directions. Stable states in energy by these two degenerate minimum values are realized in the superconducting ring member 40. And, $\theta_1$ and $\theta_2$ which correspond to the two minimum values degenerate in diagonal directions are the phase differences which are realized.

In FIG. 5, the two minimum values degenerate in energy become the two stable states. These two stable states are regarded as $|\uparrow\rangle$ and $|\downarrow\rangle$. In the states $|\uparrow\rangle$ and $|\downarrow\rangle$, currents of a same magnitude and mutually opposite in direction flow in the superconducting ring member 40, and correspondingly thereto, magnetic fluxes of a same magnitude and mutually opposite in direction pass through the superconducting ring member 40. The magnitude of the fluxes is that $|\Phi| \approx 4.8 \times 10^{-4}$ $\Phi_0 \sim 10^{-18}$ Wb.

In the case of FIG. 5, if alumina ($Al_2O_3$; dielectric constant $\kappa \sim 8.5$) is used for the insulators 36 and 37 in the first and second 0-junctions 41 and 42, electrostatic energy per single electron, namely single electron Coulomb energy: $E_C = e^2/2C_{1,2}$ (where e is elementary charge) then has the value of $E_C \sim 1.7 - 10^{24}$ J. Also, using a typical value $I_0 \sim 500$ nA of the Josephson critical current at the first and second 0-junctions 41 and 42, Josephson coupling constant $E_0 = 1.6 \times 10^{-22}$ J is obtained.

As for the single electron Coulomb energy $E_C$ and the electrostatic energy, there exists relation: $K = Q^2/2C = (ne)^2/2C = n^2 E_C$ where n is the number of electrons at each junction.

The value $1.7 \times 10^{-24}$ J of the electrostatic energy $E_C$ becomes close in the order to the value $1.6 \times 10^{-22}$ J of Josephson coupling constant $E_0$. This causes the effect of electrostatic energy corresponding to kinetic energy in the phase space to bring about a tunneling effect between two states, $|\uparrow\rangle$ and $|\downarrow\rangle$, degenerate in energy in the superconducting ring member 40, thereby developing the bonding and antibonding states in which $|\uparrow\rangle$ and $|\downarrow\rangle$ are superimposed. Here, the bonding state: $|0\rangle$ is expressed by $|0\rangle \propto |\uparrow\rangle + |\downarrow\rangle$ and is a ground state. The antibonding state $|1\rangle$ is expressed by $|1\rangle \propto |\uparrow\rangle - |\downarrow\rangle$, and is an excitation state.

Thus, the bonding state $|0\rangle = |\uparrow\rangle + |\downarrow\rangle$ and the antibonding state $|1\rangle = |\uparrow\rangle - |\downarrow\rangle$ are utilized for bits in the superconducting ring member 40 as quantum bits. Therefore, the bonding and antibonding states can be realized by the quantum bit constituted of one π junction and two 0 junctions, that is, Josephson junctions 41, 42, 43 three in total of the superconducting ring member 40 in which conditions such as electrostatic energies $K_1$, $K_2$ and $K_3$, Josephson coupling constant $E_0$ and $\gamma$ are appropriately chosen.

Since an energy gap ΔE exists between the bonding and antibonding states, the presence of the bonding or antibonding state can be ascertained by irradiating the quantum bit with a microwave having angular frequency ω=ΔE/h (where h is the Planck constant) which corresponds to the gap and observing its resonance absorption. The frequency (f=ω/2π) corresponding to the gap becomes around several GHz from various constants for use. in computation of the total free energy shown in FIG. 5.

The bonding and antibonding states can be realized without applying external magnetic field. Further, in two degenerate states, since currents mutually opposite in direction flow through the superconducting ring member 40, they are easy to discriminate. Since the quantum bit according to the present invention is constituted of only three junctions, its structure is simple and the device can be reduced in size. Thus, the decoherence is hard to occur. Also, the device can be manufactured easily.

The two stable states in the superconducting ring member 40 and the bonding and antibonding states to be brought about can be realized at the same time. On the other hand, the superconducting ring member 40 can be initialized as follows. Namely, when it is kept at low temperature sufficient so that the thermal excitation from the bonding state $|0\rangle$, which is a ground state, to the antibonding state $|1\rangle$, which is an excitation state, may not occur, it can be relaxed to the ground state and hence be initialized to the bonding state $|0\rangle$.

In the case of exciting from the bonding state $|0\rangle$ of the superconducting ring member 40 to its antibonding state $|1\rangle$, if the superconducting ring member 40 is irradiated with a microwave of a frequency corresponding to the energy gap $\Delta E_{C1}$ which is when the superconducting ring member 40 is in the state |1>, its state can be excited from the bonding state |0> to the antibonding state |1>.

Next, the readout operations of the bonding and antibonding states of the quantum bit will be explained. The bonding and antibonding states of the quantum bit of the superconducting ring member 40 are read out by the superconducting quantum interference device of the quantum state detecting member 60 disposed around the Josephson quantum bit of the superconducting ring member 40. In this case, a bias current is applied between current terminals 57 and in the superconducting quantum interference device of the quantum state detecting member 60. A value of current (switching current), which gives rise to a finite voltage when the current is increased, is measured for readout.

Here, the mention is made of where no external magnetic flux is applied ($\Phi_{ext}=0$).

The zero magnetic flux will be detected as an anticipated value when the quantum bit is in the bonding or antibonding state, since magnetic fluxes mutually opposite in direction enter to the superconducting ring member 40 in the degenerated |↑> and |↓> states.

Figure 6:
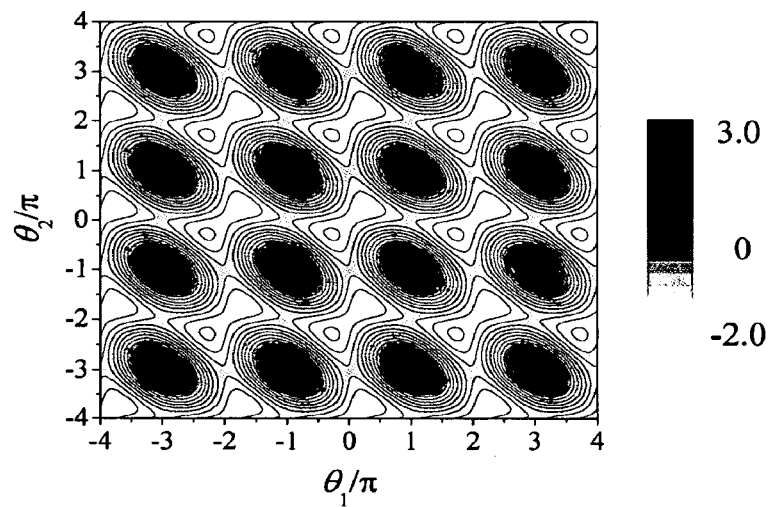
FIG. 6 shows results of computation of total free energy where a small magnetic flux is applied wherein (A) is a contour diagram in a ($\theta_1$, $\theta_2$) space under an external magnetic field ($\Phi_{ext}=0.01\Phi_0$) and (B) is a diagram illustrating the dependence of $U_{tot}$ on phase space diagonal direction.
Figure 6:
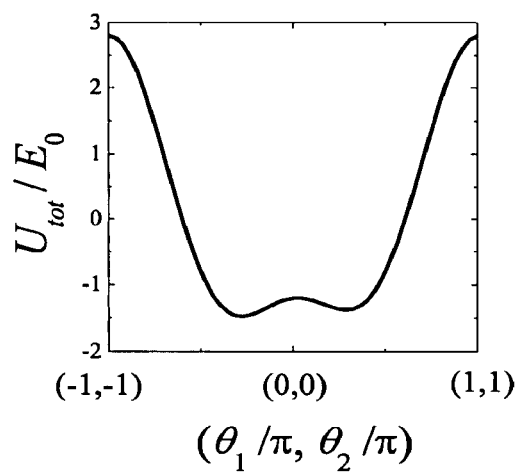

On the other hand, since an asymmetry in θ dependence of the potential occurs when a small magnetic flux is applied ($\Phi_{ext} \neq 0$), a finite flux is detected in the bonding and antibonding states as well. FIG. 6 shows results of computation of the total free energy where a small magnetic flux is applied wherein (A) is a contour diagram in a ($\theta_1$, $\theta_2$) space under an external magnetic field ($\Phi_{ext}=0.01\Phi_0$) and (B) is a diagram illustrating the dependence of $U_{tot}$ on phase space diagonal direction. The values of various parameters other than the external magnetic field are the same as in FIG. 5. As is apparent from FIG. 6, applying a magnetic field relieves the states |↑> and |↓> from degeneration to bring about an asymmetry of potential in diagonal direction centering on the coordinate (2n π, 2m π). As a result, currents flowing turning in mutually opposite directions through the superconducting ring in the bonding and antibonding states make it possible to discriminate the states of the quantum bit with the SQUID detector. Thus, it is possible to read out the bonding and antibonding states of the quantum bit in the superconducting ring member 40 by varying the external magnetic field in the vicinity of zero while making a flux measurement with the superconducting quantum interference device of the quantum state detecting member 60.

An operation with Josephson quantum computing devices according to the present invention will be explained. It is necessary to realize one-bit operations and a two-bit controlled NOT logic operation (hereinafter, also referred to as controlled NOT gating) in order to construct a universal circuit using quantum bits according to Josephson quantum computing devices 1 or 30 of the present invention.

First, as for a one-bit operation, any state of superposition can be realized in oscillations (Rabi oscillations) between the bonding and antibonding states using microwave resonance by adjusting the pulse width of the microwave.

A two-bit controlled NOT gating can be realized using quantum bits according to Josephson quantum computing devices 1 or 30 of the present invention as stated below.

Figure 7:
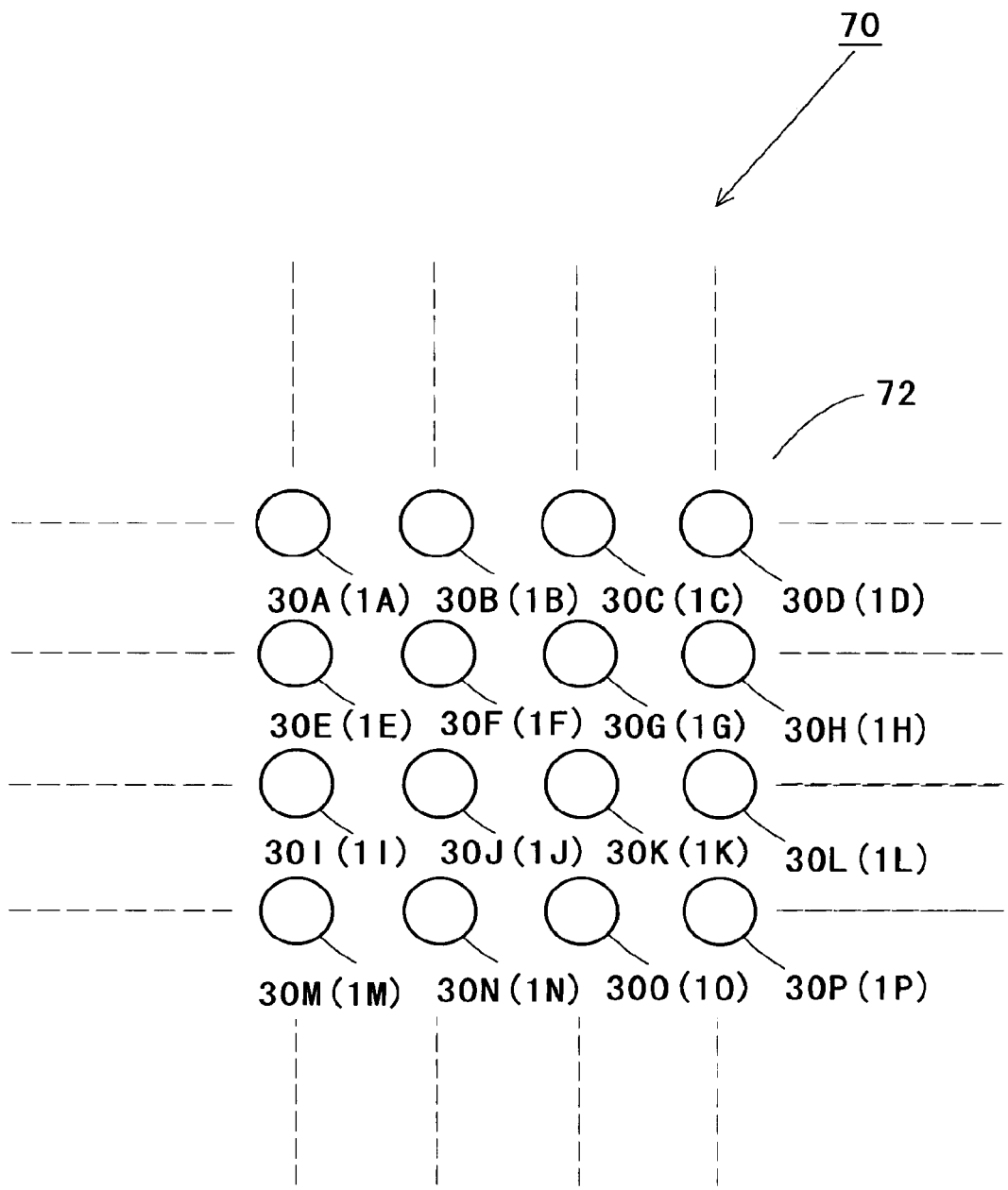
FIG. 7 is a plan view diagrammatically illustrating an integrated circuit using Josephson quantum computing devices according to the present invention.

Mention is first made of an integrated circuit with Josephson quantum computing devices 1, 30 of the present invention. FIG. 7 is a plan view diagrammatically illustrating an integrated circuit 70 using Josephson quantum computing devices according to the present invention. In the Figure, the integrated circuit 70 using Josephson quantum computing devices 30 is formed as the matrix configuration on a substrate 72 with the Josephson quantum computing devices 30 of the present invention. The substrate 72 used may be an insulating substrate. While the Josephson quantum computing devices are shown as 30A-30P, they may be Josephson quantum computing devices 1A-1P. The number of devices may arbitrarily be set as desired. Two adjacent quantum bits of the Josephson quantum computing devices 30A-30P are arranged spaced apart at a distance such that they are affected each other by their mutual magnetic interaction.

Figure 8:
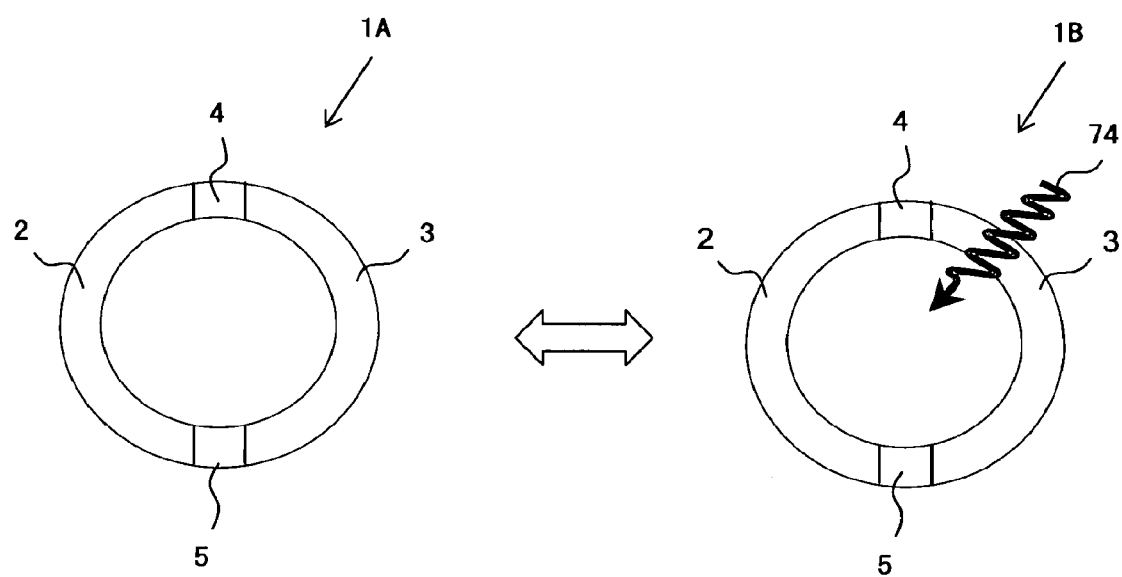
FIG. 8 is a diagrammatic explanatory view illustrating operations of a NOT gate controlled with adjacent two quantum bits in an integrated circuit using Josephson quantum computing devices according to the present invention.

Mention is next made of the NOT gating controlled by adjacent two quantum bits in the integrated circuit 70 using the Josephson quantum computing devices 1, 30 of the present invention. FIG. 8 is an explanatory view diagrammatically illustrating operations of a NOT gate controlled with adjacent two quantum bits in an integrated circuit using Josephson quantum computing devices 1 according to the present invention. As shown, adjacent quantum bits 1A and 1B are arranged spaced apart at a distance (see the two-headed arrow in FIG. 8) such that they are affected each other by their mutual magnetic interaction. Here, the quantum bits 1A and 1B have their superconducting ring members shown and their quantum state detecting members are omitted.

The quantum bits 1A and 1B play their respective roles as a control and a target quantum bit. For a magnetic interaction between quantum bits 1A and 1B, the energy gap in target quantum bit 1B depends on the state of control quantum bit 1A. More specifically, the current flowing through the quantum bit 1A gives the quantum bit 1B an effective external flux through their mutual inductance. Since the orientation of this effective external magnetic flux depends on the orientation of the current through the quantum bit 1A, the magnitude of the total external magnetic flux applied to the quantum bit 1B depends on the state of the quantum bit 1A.

Consider that the energy gaps of the quantum bit 1B if the control quantum bit 1A is in the state |0> and in the state |1> are $\Delta E_{B0}$ and $\Delta E_{B1}$, respectively. When this target quantum bit 1B is irradiated with a microwave 74 of a frequency corresponding to $\Delta E_{B1}$, the target quantum bit 1B changes its state only when the control quantum bit 1A is in the state |1>. In this way, a NOT gate controlled by two of Josephson quantum computing devices 1 is realized.

Figure 9:
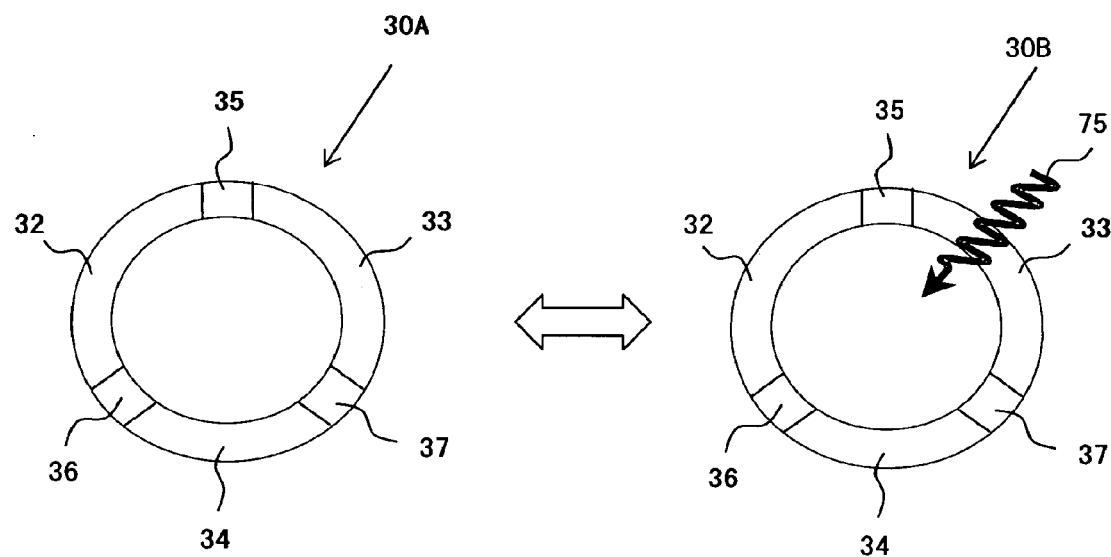
FIG. 9 is a diagrammatic explanatory view illustrating operations of a NOT gate controlled with adjacent two quantum bits in an integrated circuit using Josephson quantum computing devices according to the present invention.

FIG. 9 is an explanatory view diagrammatically illustrating operations of the NOT gate controlled with adjacent two quantum bits in the integrated circuit using Josephson quantum computing devices 30 according to the present invention. As shown, adjacent quantum bits 30A and 30B are arranged spaced apart at a distance (see the two-headed arrow in FIG. 9) such that they are affected each other by their mutual magnetic interaction. Here, the quantum bits 30A and 30B have their superconducting ring members shown and their quantum state detecting members are omitted.

In the above quantum bits, the quantum bits 30A plays role as a control bit and the quantum bits 30B plays role as a target bit. For a magnetic interaction between quantum bits 30A and 30B, the energy gap in target quantum bit 30B depends on the state of control quantum bit 30A. More specifically, the current flowing through the quantum bit 30A gives the quantum bit 30B an effective external flux through their mutual inductance. Since the orientation of this effective external magnetic flux depends on the orientation of the current through the quantum bit 30A, the magnitude of the total external magnetic flux applied to the quantum bit 30B depends on the state of the quantum bit 30A.

Consider that the energy gaps of the quantum bit 30B if the control quantum bit 30A is in the state |0> and in the state |1> are $\Delta E_{C0}$ and $\Delta E_{C1}$, respectively. When this target quantum bit 30B is irradiated with a microwave 75 of a frequency corresponding to $\Delta E_{C1}$, the target quantum bit 30B changes its state only when the control quantum bit 30A is in the state |1>. In this way, a NOT gate controlled by two of Josephson quantum computing devices 30 is realized as in the case that two Josephson quantum computing devices 1 are used.

FIG. 10 is a truth table showing the operations of the NOT gates controlled with 2 quantum bits as in FIGS. 8 and 9. As is shown, when the input control quantum bit 1A (30A) is in the state |1>, it is possible to change the output of the target quantum bit 1B (30B) from the state |1> to the state |0> or from the state |0> to the state |1>. Then, the state of the target quantum bit 1B (30B) can be changed from the state |0> to the state |1> or from the state |1> to the state |0> can be changed by irradiating the target quantum bit 1B (30B) with a microwave of a frequency corresponding to $\Delta E_{B1}$ ($\Delta E_{C1}$) and effecting a Rabi oscillation between the bonding and antibonding states using the resonance. Here, the microwave irradiation can be adjusted by varying its pulse width or frequency. Thus, the operations of a controlled NOT gate can be realized according to 2 quantum bits using two of Josephson quantum computing devices 1 or Josephson quantum devices 30.

The Josephson quantum computing device 30 and the integrated circuit with such devices according to the present invention can be manufactured as stated below.

First, a superconductor becoming the superconducting ring member 40 and the quantum state detecting member 60 is deposited by sputtering to a selected thickness. Then, the superconducting ring member 40 and the ring of quantum state detecting member 60 are formed by selective etching with mask. The superconductor at those areas of the ferromagnetic metal 35 and the insulators 36 and 37 of the superconducting ring member 40 and the insulators 53 and 54 of the quantum state detecting member 60 is etched, too.

Next, an insulating material such as aluminum oxide becoming the insulators 36, 37, 53 and 54 is deposited by sputtering or CVD method to a selected thickness. And, excess portions of the insulator material are removed by selective etching. In this process step, the first and second 0-junctions 41 and 42 of the superconducting ring member 40 and the quantum state detecting member 60 are formed.

Finally, a film of the ferromagnetic metal 35 is deposited by sputtering to a selected thickness. And, an excess portion of the ferromagnetic metal film 35 is removed by selective etching. In this process step, the π-junction 43 in the superconducting ring member 40 is formed. In depositing each material, an ordinary thin film forming method such as vapor deposition, laser ablation or MBE other than sputtering or CVD may be used. Also, in masking steps for forming junctions and current terminals of selected shapes, photo or electron beam exposure may be used.

The present invention is not limited to these specific examples and allows various modifications thereof to be made within the scope of the invention set forth in the appended claims, and it is a matter of course that these modifications as well fall in the scope of the present invention.

What is claimed is:

1. A Josephson quantum computing device, characterized in that it comprises:
   a superconducting ring member having a first and a second 0-junction and a π-junction each of which is constituted of a Josephson junction; and
   a quantum state detecting member constituted by a superconducting quantum interference device arranged outside of said superconducting ring member, wherein:
   a bonding and an antibonding state brought about by a tunneling effect between a |↑> and a |↓> state as two states degenerate in energy of said superconducting ring member are regarded as quantum bits, and
   said bonding and antibonding states as the quantum bits are read out by said quantum state detecting member.

2. The Josephson quantum computing device as set forth in claim 1, characterized in that:
   said superconducting ring member comprises a first, a second and a third superconductor which as a whole are disposed in the form of a ring and are strips essentially tri-partitioned of the ring and arranged having three interspaces open between their adjacent ends and a ferromagnetic body and a first and a second insulator with which the three interfaces are filled, respectively, wherein:
   said first superconductor, said first insulator and said third superconductor together form said first 0-junction,
   said second superconductor, said second insulator and said third superconductor together form said second 0 junction, and
   said first superconductor, said ferromagnetic body and said second superconductor together form said π-junction.

3. The Josephson quantum computing device as set forth in claim 1, characterized in that said bonding and antibonding states of said superconducting ring member are controlled by a ratio (γ) of Josephson coupling constants at said first and second 0-junctions and said π-junction.

4. The Josephson quantum computing device as set forth in claim 1, characterized in that said bonding and antibonding states as the quantum bits are read out by said quantum state detecting member upon applying thereto an external magnetic field.

5. The Josephson quantum computing device as set forth in claim 1, characterized in that said bonding and antibonding states as the quantum bits are states that are superposed arbitrarily as desired by a microwave with which said quantum bits are irradiated.

* * * * *